US011433797B2

(12) United States Patent
Fan

(10) Patent No.: US 11,433,797 B2
(45) Date of Patent: Sep. 6, 2022

(54) MULTIFUNCTIONAL VEHICLE-MOUNTED CIGARETTE LIGHTERS

(71) Applicant: GUANGZHOU HANMA ELECTRONICS CO., LTD., Guangzhou (CN)

(72) Inventor: Shijun Fan, Guangzhou (CN)

(73) Assignee: GUANGZHOU HANMA ELECTRONICS CO., LTD., Guangzhou (CN)

(*) Notice: Subject to any disclaimer, the term of this patent is extended or adjusted under 35 U.S.C. 154(b) by 683 days.

(21) Appl. No.: 16/369,235

(22) Filed: Mar. 29, 2019

(65) Prior Publication Data
US 2020/0164783 A1    May 28, 2020

(30) Foreign Application Priority Data
Nov. 26, 2018   (CN) .......................... 201821961557.1

(51) Int. Cl.
*B60N 3/14*       (2006.01)
*B60Q 3/88*       (2017.01)
*B60Q 3/275*      (2017.01)
*F21Y 115/10*     (2016.01)

(52) U.S. Cl.
CPC .............. *B60N 3/14* (2013.01); *B60Q 3/275* (2017.02); *B60Q 3/88* (2017.02); *F21Y 2115/10* (2016.08)

(58) Field of Classification Search
CPC ............. B60Q 3/275; B60Q 3/88; B60N 3/14
See application file for complete search history.

(56) References Cited

U.S. PATENT DOCUMENTS 6,164,792 A * 12/2000 Nakagome ............... B60Q 3/88
362/276

FOREIGN PATENT DOCUMENTS

| CN | 204794163 U | 11/2015 |
| CN | 206077641 U | 4/2017 |

* cited by examiner

*Primary Examiner* — Thomas M Sember
(74) *Attorney, Agent, or Firm* — Kagan Binder, PLLC

(57) ABSTRACT

The present disclosure provides a multifunctional vehicle-mounted cigarette lighter, including a cigarette lighter body, which is configured with a power plug matched with a vehicle cigarette lighter socket, wherein the cigarette lighter body is further provided with a control unit connected to an on-board warning light and a display unit in signal connection to the control unit; the control unit includes a control circuit board for synchronously acquiring the working mode of the on-board warning light, wherein the control circuit board is connected to the on-board warning light through a signal control line; the display unit includes a plurality of indicator lights for synchronously displaying the working mode of the on-board warning light, wherein the plurality of indicator lights are electrically connected to the control circuit board. The present disclosure enables determination of the working mode of the on-board warning light directly though the working mode displayed on the display unit (the plurality of indicator lights) on the cigarette lighter body, which is visual and convenient.

8 Claims, 2 Drawing Sheets

MULTIFUNCTIONAL VEHICLE-MOUNTED CIGARETTE LIGHTERS

CROSS REFERENCE TO RELATED APPLICATION

This application claims priority to Chinese Patent Application No. 201821961557.1, entitled "MULTIFUNCTIONAL VEHICLE-MOUNTED CIGARETTE LIGHTERS" filed on Nov. 26, 2018, the contents of which are expressly incorporated by reference herein in their entirety.

TECHNICAL FIELD

The present disclosure relates to a vehicle-mounted device, and more particularly, to a multifunctional vehicle-mounted cigarette lighter for synchronously displaying the working mode of an on-board warning light.

BACKGROUND

Vehicle-mounted cigarette lighter has become an essential in-vehicle component for the passengers during the journey. With the continuous development of society, more and more vehicle-mounted cigarette lighters appear on the market. However, most of them are relatively simple in function and used for lighting cigarette only.

Currently, there are also improved applications for cigarette lighters. For example, a vehicle-mounted charging device was disclosed in Chinese Patent Application No. 201520386155.3, comprising an anode, a cathode, a cigarette lighter plug, a charger body, a button, a first indicator light, wires, a charging box, a power interface, and a second indicator lights. An anode is provided at the top of the cigarette lighter plug, and a cathode is arranged on each side thereof. The cigarette lighter plug is connected to the charger body. At the end surface of the charger's main body it is provided with a button, a first indicator light and a wire outlet. The wire outlet leads wires out of the charger main body to a charging box that is configured with a plurality of power interfaces; and, the second indicator lights are disposed below each power interface.

As another example, Chinese Patent Application No. 201621065566.3 discloses a bluetooth headset and an on-board cigarette lighter inserted on a vehicle-mounted cigarette lighter. The bluetooth headset inserted in the vehicle-mounted cigarette lighter includes a headphone body and a built-in circuit. A call button is provided at the top surface of the earphone body. The bottom surface of the earphone body extends with an ear portion, and an earplug head is disposed at the end of the ear portion. The bottom surface of the earphone body has a contact electrode matched with the vehicle-mounted cigarette lighter; and the built-in circuit has a bluetooth communication module connected to the smart terminal. This application also provides a vehicle-mounted cigarette lighter, which is provided with a receiving slot for resting a bluetooth earphone, an electrode column for engaging with the contact electrode of the bluetooth earphone, and a magnetic block located at the receiving slot. The magnetic block absorbs the metal piece or the magnetic piece in the bluetooth earphone to realize convenient insertion and alignment of the Bluetooth earphone.

Among other things, the cigarette lighter is also applied to control the on-board warning light. However, a commonly used cigarette lighter only supplies power to the on-board warning light, and it is unable to reflect the specific working mode of the on-board warning light. It is neither convenient nor visual for a user sitting in the vehicle to control the warning light.

SUMMARY

In view of deficiencies of the prior art, the present disclosure provides a multifunctional vehicle-mounted cigarette lighter which is capable of synchronously displaying the working mode of the on-board warning light.

For at least the purpose above, the present disclosure provides a multifunctional vehicle-mounted cigarette lighter, which includes a cigarette lighter body that is configured with a power plug matched with a vehicle cigarette lighter socket, wherein the cigarette lighter body is further provided with a control unit connected to the on-board warning light and a display unit in a signal connection to the control unit.

The control unit includes a control circuit board for synchronously acquiring the working mode of the on-board warning light, wherein the control circuit board is connected to the on-board warning light through the signal control line.

The display unit includes a plurality of indicator lights for synchronously displaying the working mode of the on-board warning light, wherein the plurality of indicator lights are electrically connected to the control circuit board.

In the above-described technical solution of the present disclosure, the control circuit board in the control unit has an identical working mode program to that in the on-board warning light.

The control circuit board controls the plurality of indicator lights in the display unit to synchronously display the working mode of the on-board warning light, such as by blinking, flowing, tailing and constant lighting, and the like. The status displayed by the plurality of indicator lights is synchronized with the status displayed by the external on-board warning light. For example, when the on-board warning light is displayed as in blinking mode, the plurality of indicator lights on the cigarette lighter body are synchronously displayed as in blinking mode.

Preferably, the number of the indicator lights in the present disclosure is 6 to 14. For example, 10 indicator lights may be provided.

According to another embodiment of the present disclosure, the plurality of indicator lights in the display unit is disposed on the end surface of the cigarette lighter body that is distal to the power plug.

According to another embodiment of the present disclosure, the indicator lights in the present disclosure are preferably LED indicator lights, wherein the display color of the indicator light may be a single color or a combination of multiple colors; preferably, the indicator lights are of a combination of multiple colors.

According to another embodiment of the present disclosure, the control unit further includes a switch control button disposed on the end surface of the cigarette lighter body that is distal to the power plug.

The control unit further includes a mode switching button for adjusting the mode of the on-board warning light; and the mode switching button is disposed on the end surface of the cigarette lighter body that is distal to the power plug.

Among other things, the switch control button and the mode switch button may have the same or different appearance and shape. Preferably, the switch control button and the mode switch button have different appearance and shape. For example, the switch control button has an obvious identification mark, for example, a power symbol.

Further, the plurality of indicator lights in the display unit is disposed to surround the outside of the switch control button and the mode switching button.

Correspondingly, the switch control button and the mode switch button may further be configured to be protruded from the end surface of the cigarette lighter body that is distal to the power plug.

The present disclosure has the following beneficial effects:

When using the indicator lights, a user can determine the working mode of the on-board warning light directly through the display state of the display unit (the plurality of indicator lights) on the cigarette lighter body, which is visual and convenient.

The present disclosure will be further described in detail below with reference to the accompanying figures.

DETAILED DESCRIPTION OF THE EMBODIMENTS

Figure 1:
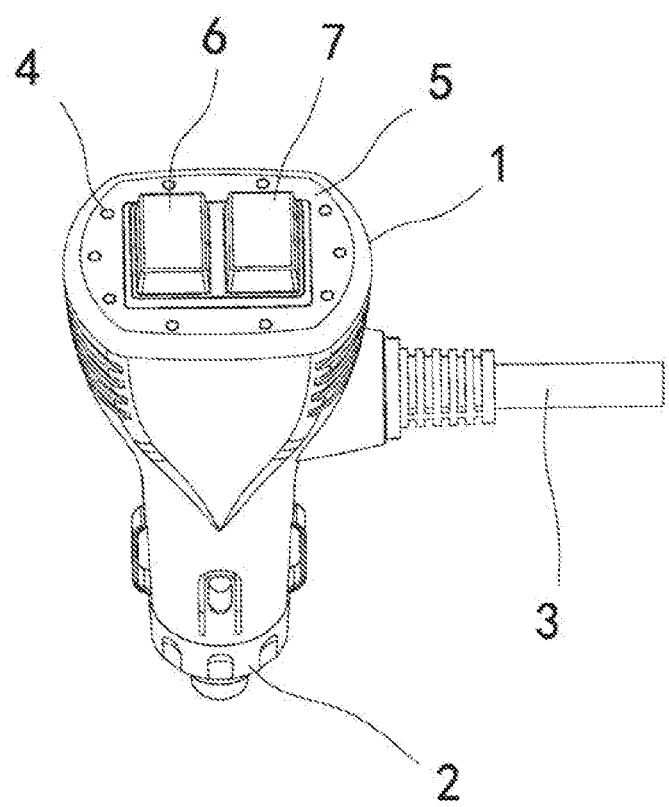
FIG. 1 is a schematic diagram of the overall structure of a multifunctional cigarette lighter of the present disclosure.
Figure 2:
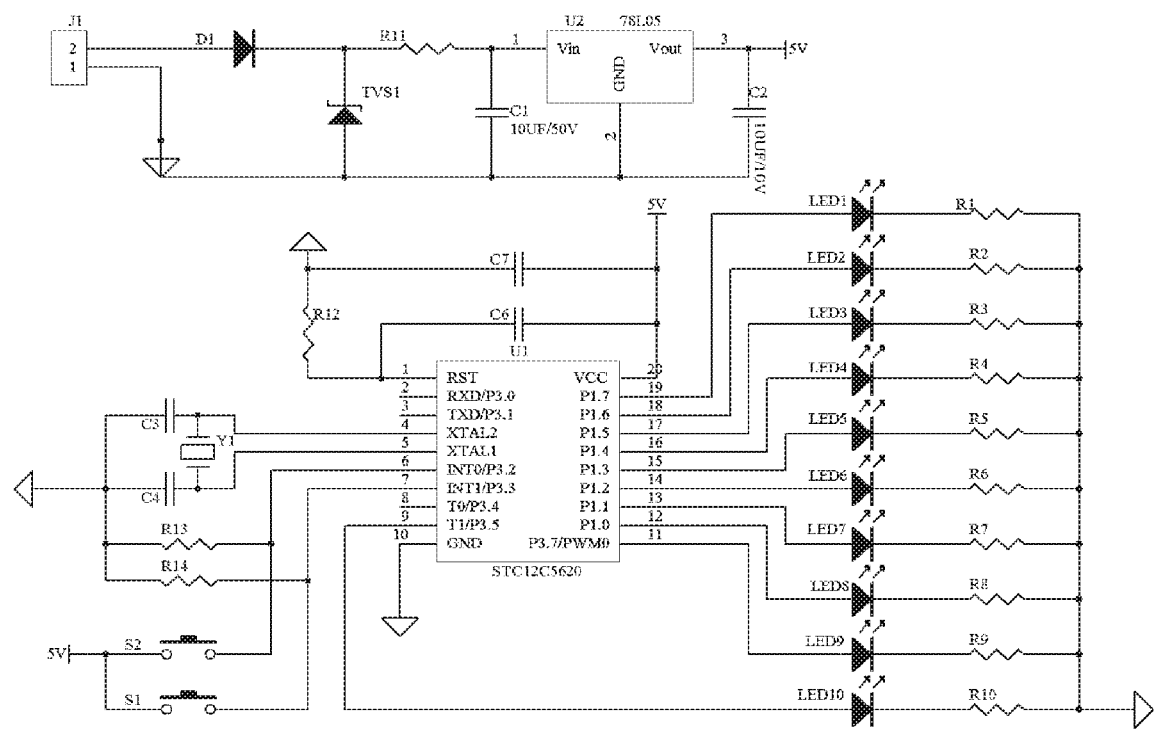
FIG. 2 is a circuit diagram of a multifunctional cigarette lighter of the present disclosure.

As shown in FIGS. 1-2, a multifunctional cigarette lighter, comprising a cigarette lighter body 1, a power plug 2 provided on the cigarette lighter body 1, a control unit and a display unit.

Among other things, the power plug 2 is matched with the vehicle cigarette lighter socket for supplying power to the entire cigarette lighter.

The control unit is configured to connect to the on-board warning light control, and includes a control circuit board for synchronously acquiring the working mode of the on-board warning light, for example, writing the control circuit in the form of a single-chip microcomputer; and, correspondingly, the control circuit board is connected to the on-board warning light through the signal control line 3.

Specifically, the circuit diagram of a control circuit board of this embodiment is shown as FIG. 2. Preferably, the program on the control circuit board may be identical to the program in the on-board warning light.

The display unit is configured to synchronously display the working mode of the on-board warning light, and includes a plurality of indicator lights 4 for synchronously displaying the working mode of the on-board warning light, wherein, the indicator lights 4 may select to use LED indicator lights which may display multiple colors. Preferably, the number of the indicator lights 4 may be 6-14, and for example, 10. The plurality of indicator lights 4 are electrically connected to the control circuit board.

Specifically, the control circuit board in the control unit of this embodiment may have the identical working mode program to that in the on-board warning light. The control circuit board controls the plurality of indicator lights 4 in the display unit to synchronously display the working mode of the on-board warning light, such as blinking, flowing, tailing and constant lighting, and the like. The status displayed by the plurality of indicator lights 4 may be synchronized with the status displayed by the external on-board warning light. For example, when the on-board warning light is displayed as blinking state, the plurality of indicator lights on the cigarette lighter body may be synchronously displayed as blinking state.

Referring back to FIG. 1, the plurality of indicator lights 4 in the display unit of the present embodiment may be disposed on the end surface 5 of the cigarette lighter body that is distal to the power plug. A switch control button 6 and a mode switching button 7 may be disposed on the end surface 5, wherein the switch control button 6 is configured to control whether the cigarette lighter and the on-board warning light are electrically powered. The mode switch button 7 is configured to adjust the working mode of the on-board warning light.

Further, the plurality of indicator lights 4 in the display unit is preferably disposed to surround outside of the switch control button 6 and the mode switching button 7; correspondingly, the switch control button 6 and the mode switching button 7 may further be configured to be protruded from the end surface 5 of the cigarette lighter body that is distal to the power plug.

The multifunctional cigarette lighter disclosed in this embodiment enables determination of the working mode of the on-board warning light directly through the working mode displayed on the display unit (the plurality of indicator lights) on the cigarette lighter body, which is visual and convenient.

While the disclosure provides preferred embodiments as above, it is not intended to limit the scope of the disclosure. Any person skilled in the art, without departing from the scope of the disclosure, may make modifications. That is to say, equivalent improvements made in accordance with the present disclosure should be considered as encompassed by the scope of the present disclosure.

What is claimed is:

1. A multifunctional vehicle-mounted device configured to couple to a vehicle cigarette lighter socket, comprising a body, which is configured with a power plug matched with the vehicle cigarette lighter socket, wherein the body further comprises a control unit connected to an on-board warning light and a display unit in signal connection to the control unit;

the control unit is disposed in the body and comprises a control circuit board configured to synchronously acquire a working mode of the on-board warning light, wherein the control circuit board is connected to the on-board warning light through a signal control line; and the display unit is disposed on the body and comprises a plurality of indicator lights configured to synchronously display the working mode of the on-board warning light, wherein the plurality of indicator lights is electrically connected to the control circuit board.

2. The multifunctional vehicle-mounted device according to claim 1, wherein the plurality of indicator lights is disposed on an end surface of the body that is distal to the power plug.

3. The multifunctional vehicle-mounted device according to claim 2, wherein the control unit further comprises a switch control button disposed on the end surface of the body that is distal to the power plug.

4. The multifunctional vehicle-mounted device according to claim 3, wherein the control unit further comprises a mode switching button for adjusting the mode of the on-board warning light, the mode switching button is disposed on the end surface of the body that is distal to the power plug.

5. The multifunctional vehicle-mounted device according to claim 4, wherein the plurality of the indicator lights is disposed to surround outside of the switch control button and the mode switching button.

6. The multifunctional vehicle-mounted device according to claim 4, wherein the switch control button and the mode switch button are configured to be protruded from the end surface of the body that is distal to the power plug.

7. The multifunctional vehicle-mounted device according to claim 1, wherein the indicator lights are LED indicator lights.

8. The multifunctional vehicle-mounted device according to claim 1, wherein the number of the indicator lights is 6 to 14.

* * * * *